United States Patent [19]
Pritchard et al.

[11] Patent Number: 4,510,522
[45] Date of Patent: Apr. 9, 1985

[54] CCD COMB FILTER EMPLOYING FLOATING GATE SUBTRACTOR TECHNIQUES

[75] Inventors: Dalton H. Pritchard, Princeton; Donald J. Sauer, Plainsboro, both of N.J.

[73] Assignee: RCA Corporation, New York, N.Y.

[21] Appl. No.: 383,301

[22] Filed: May 28, 1982

[51] Int. Cl.³ .............................................. H04N 9/535
[52] U.S. Cl. ...................................... 358/31; 358/37; 358/23; 333/165
[58] Field of Search ............... 358/31, 30, 37, 39, 358/40, 23; 333/165, 166; 307/409

[56] References Cited

U.S. PATENT DOCUMENTS

| | | | |
|---|---|---|---|
| 4,096,516 | 6/1978 | Pritchard | 358/31 |
| 4,104,543 | 8/1978 | Maeding | 307/221 |
| 4,158,209 | 6/1979 | Levine | 358/31 |
| 4,195,273 | 3/1980 | Prince | 333/165 |
| 4,205,335 | 5/1980 | Nakagawa | 358/31 |
| 4,217,605 | 8/1980 | Carnes | 358/31 |
| 4,353,093 | 10/1982 | Durbin, Jr. | 358/31 |
| 4,377,794 | 3/1983 | Sakaue | 358/31 |

OTHER PUBLICATIONS

Design and Performance of a CCD Comb Filter IC, by D. J. Sauer, RCA Review, vol. 41, No. 1, Mar. 1980, pp. 29-56.

Primary Examiner—Tommy P. Chin
Attorney, Agent, or Firm—E. M. Whitacre; P. M. Emanuel; L. C. Edelman

[57] ABSTRACT

A charge transfer device (CTD) delay line comb filter for separating the frequency interleaved luminance and chrominance components of a composite video signal is provided wherein signal charges representative of the composite video signal within first and second delay lines are effectively subtracted one from the other by alternately passing them under a common, periodically clamped, normally floating sense electrode. This eliminates the need for a phase inverter, which causes imperfect separation due to having a non-zero time delay and not having exactly unity gain.

12 Claims, 27 Drawing Figures

CCD COMB FILTER EMPLOYING FLOATING GATE SUBTRACTOR TECHNIQUES

This invention relates to comb filter circuits, and in particular, to charge coupled device (CCD) comb filter arrangements.

Conventional television broadcast signals are arranged so that luminance information of an image is represented by clusters of signals at frequencies which are integral multiples of the horizontal line scanning frequency and chrominance information of the image is represented by clusters of signals at frequencies within the luminance spectrum which are between the multiples of the line scanning frequency. In the NTSC system, the luminance components are at even multiples of one-half the line scanning frequency and have the same phase on succeeding scan lines. The chrominance components are at odd multiples of one-half the line scanning frequency and are caused to be exactly 180° out of phase on succeeding scan lines.

Chrominance and luminance information encoded as described above may be recovered in a comb filter by "combing" the composite signal spectrum. In a comb filter system, replicas of the composite video signal are produced which are delayed in time from each other by at least one line scanning interval (a so-called 1H delay). By adding 1H delayed signals from one line to signals from a successive line, the chrominance components are cancelled while the luminance components are reinforced. By subtracting signals from two successive lines, the luminance components are cancelled while the chrominance components are reinforced.

In U.S. Pat. No. 4,096,516—Pritchard, a CCD comb filter arrangement for separating the luminance and chrominance signal components of the composite color television signal is described. Parallel signal paths formed by long and short CCD delay lines using a common clock drive frequency and terminating in a common charge summer, are provided. In the illustrative embodiment suitable for processing standard NTSC broadcast signals, clock signals at a frequency equal to three times the frequency of the NTSC color subcarrier (i.e., equal to 3×3.579545 MHz, or 10.738635 MHz) are employed to control corresponding charge packets of the television signal transferred in a long delay line of 683½ stages and a pair of short delay lines of one stage each. Since the delay provided by a CCD structure is solely a function of the number of stages and the clocking frequency used, the differential delay between corresponding charge packets in the long and short delay lines is 682.5/10.738635 MHz or 63.55 microseconds, a 1H delay. Additive combination of charge packets transferred by a long delay line and one of the short delay lines at a first charge summer is used to obtain a first comb filter characteristic exhibiting regularly spaced peaks at even integer multiples of one-half the line frequency by which a combed luminance signal is derived. Subtractive combination of charge packets transferred by the long delay line and by the other of the short delay lines at a second charge summer is used to obtain a second comb filter characteristic exhibiting regularly spaced peaks at odd integer multiples of one-half the line frequency. With suitable bandpass filtering, a combed chrominance signal is derived from the output signal of the second charge summer.

In this comb filter arrangement, most of the comb filter components can be implemented within a CCD structure formed on a single integrated circuit substrate. The additive combination is accomplished by physically bringing the two CCD channels together and removing a channel stop therebetween (which separated the channels on the substrate) to "merge" the two channels to form one CCD channel (i.e., "merging"). This "merger" makes essentially a perfect adder. In order to achieve the deepest possible null at exactly the right frequencies in the comb filter characteristics, the amplitude and phase of the 1H relatively delayed video signals at the point of combination must be precisely matched. Since the first comb filter characteristic is accomplished using channel merging, the additive combining is done entirely within the CCD structure and the video signals at the point of combination are almost precisely matched, neglecting the small amplitude loss in the long delay line due to the cumulative effect of CCD charge transfer inefficiency.

However, the generation of the second comb filter characteristic requires the use of a unity gain phase inverter at the signal input for the other short delay line, in order that the charge combination at the ends of that short delay line and the long delay line results in the signal equivalent of charge subtraction. The phase inverter necessarily introduces a finite time delay (e.g., approximately 4 nanoseconds) which causes an envelope delay mismatch between the signals processed in the long and short delay lines. This mismatch degrades the signal separation characteristics of the comb filter and can result in ineffective removal of "dot-crawl" and "cross-color" contamination of the scene reproduced on the face of the kinescope.

Furthermore, in practice, the inverter may not provide precisely unity gain, thus introducing signal amplitude unbalance between the signals processed in the delay lines which further degrades signal cancellation and separation. Additionally, means must be included to provide amplitude trim adjustment to equalize the signal amplitudes in the long and short delay lines.

Additionally, a DC input bias circuit is required to introduce analog input signals into the CCD input stages. In the above described CCD comb filter arrangement, since a signal inverter is used, the input signal for the respective one of the short delay lines may have a different DC component than the other two delay lines. Thus, an input bias circuit is required for each of the two different signal inputs.

Accordingly, it is desirable to provide a CCD comb filter arrangement with improved amplitude and envelope delay matching between corresponding signals of the delay lines. In this regard, it is desirable to reduce the amount of signal processing circuitry external from the integrated circuit CCD structure required to provide the comb filter characteristics. Furthermore, it is desirable to provide common input signals to the input structures of the comb filter arrangement in order to reduce the amount of bias circuitry required at the CCD delay line inputs.

In accordance with the principles of the present invention, a charge transfer device (CTD) comb filter signal separation arrangement for an input signal including frequency interleaved components comprises first and second CTD delay lines on an integrated circuit substrate, each having an unequal number of stages between their respective input and output sections responsive to clock signals for transferring charge packets representative of the input signal. The delay lines provide at their respective output sections a relative time delay between the charge packets which is proportional to the period of the interleaving frequency. A periodically clamped floating sense electrode, which overlaps the output sections of both the delay lines, senses a voltage variation in response to the charge packets passing thereunder. The relative timing of the transferring of charge packets under the sense electrode is such that when the sense electrode is floating, its voltage varies by an amount proportional to the subtractive combination of the 1H relatively delayed charge pockets and is representative of one of the frequency interleaved components of the input signal.

Figure 1:
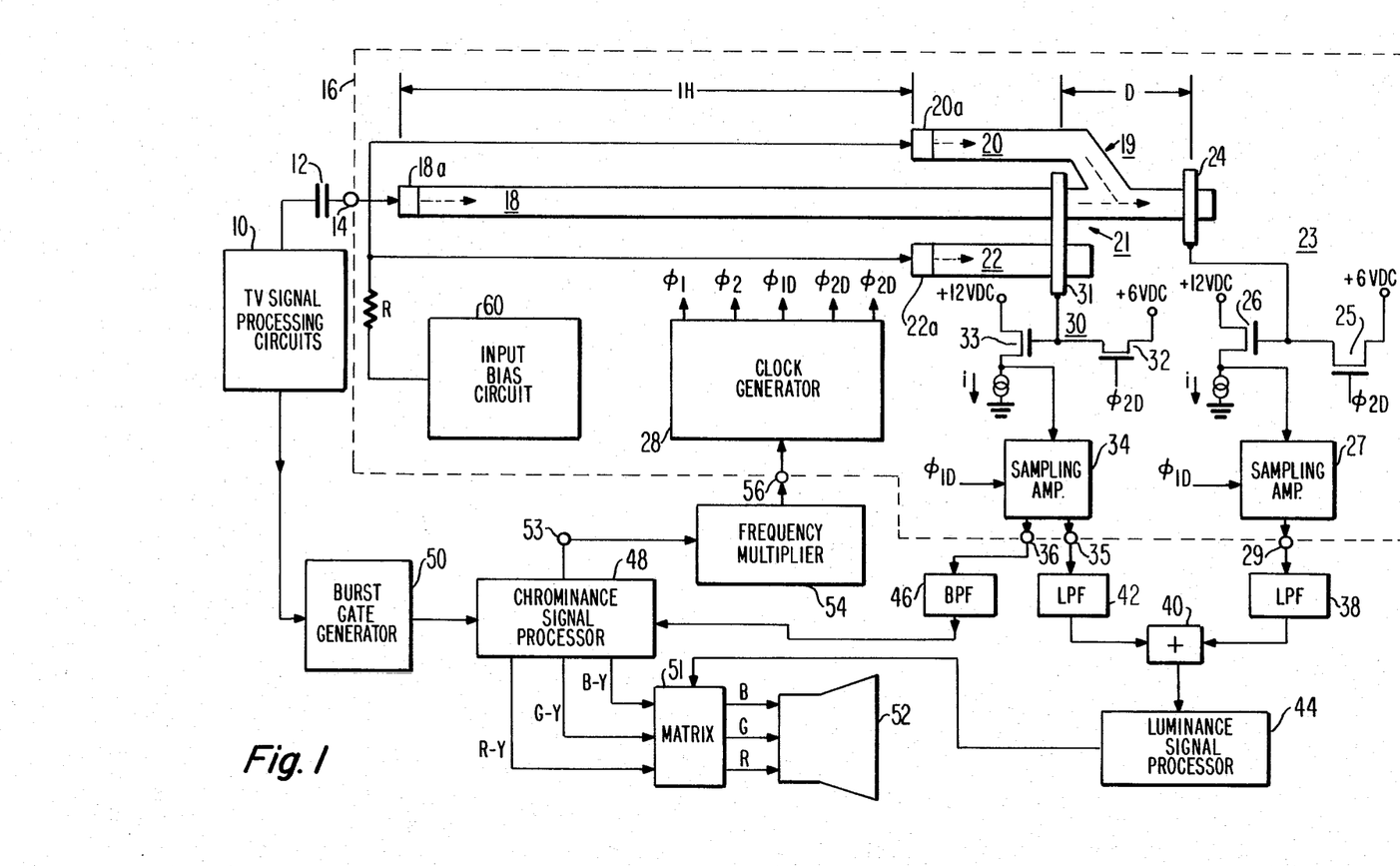
FIGS. 1 and 1a illustrate, partially in block diagram and partially in schematic diagram form, a CCD comb filter arrangement constructed in accordance with principles of the present invention.

Now referring to FIG. 1, a TV signal processing circuit 10, which includes, for example, conventional radio frequency and intermediate frequency stages and a video detector is shown for generating a composite color television video signal including frequency interleaved luminance and chrominance signal components. The composite color video signal is AC coupled via a capacitor 12 to a terminal 14 of a comb filter signal processing arrangement 16, shown enclosed by a dashed line. The dashed line includes circuit components which may be fabricated on a single monolithic integrated circuit of, for example, the N-MOS type.

The composite video signal from terminal 14 is coupled in parallel to input sections 18a and 20a of a luminance signal comb filter, including a long CCD delay line 18 and a short CCD delay line 20; and to inputs 18a and 22a of a chrominance signal comb filter, including long delay line 18 and another short CCD delay line 22.

Delay lines 18, 20 and 22 are preferably N-type buried-channel CCD delay lines utilizing first and second layers of gate electrodes to obtain asymmetrical potential wells in the underlying substrate, for permitting unidirectional charge propagation in the direction indicated by dashed arrows when clocked by oppositely phased (biphase) clock signals. Details of the CCD delay line structure and charge propagation will be discussed with respect to FIGS. 2 through 4.

Delay lines 18 and 20 are arranged to obtain a difference in signal delay precisely equal to one horizontal scanning line (a 1H delay which equals 63.55 microseconds) between samples of the composite video signals applied in parallel to the inputs of the delay lines from terminal 14. The buried channels of delay lines 18 and 20 are physically combined at a delay line section 19 having commonly clocked electrodes (e.g., the channel stop separating the channels within the substrate of the integrated circuit is removed and the channels merge together) resulting in additive combination of the 1H relatively delayed video signals which produces a combed luminance signal.

At the point of merger, the difference in signal delay provided between lines 18 and 20 is determined by the CCD clock frequency and the difference in the number of stages the signal is clocked through within each of the CCD delay lines.

The illustrative embodiment is for the NTSC system and uses a clock frequency of three times the clock subcarrier frequency (i.e., $3 \times 3.58$ MHz = 10.7 MHz). This frequency is chosen first, to comply with the Nyquist criterion related to sampled data systems which requires that a sampling rate must be at least twice the highest frequency which is to be sampled and secondly, to provide a desired stability and power consumption for the clock signal generating circuits.

It should be noted that since the clock frequency is an odd multiple (3) of the color subcarrier frequency, it is also an odd multiple of one-half the line scanning frequency $f_H$ (i.e., 10.7 MHz = $f_H \times 1365/2$). When using such a clock frequency, a fractional number of stages correspond to a signal delay of precisely 1H (i.e., 636.55 microseconds corresponds to $682\frac{1}{2}$ stages clocked at 10.7 MHz).

When sampling a signal in response to a particular phase of a clock signal, samples only exist at time periods separated by integer multiples of the clock signal period. Thus, if it is desired to combine two signals which have a relative delay therebetween corresponding to a fractional number of CCD delay line stages, it will be appreciated by those skilled in the art, that two CCD delay lines are required. Each delay line including an unequal number of stages and clocked under different phases of the clock signal in order that, at their outputs, charge packets of an applied input signal have a relative delay therebetween corresponding to the fractional number of stages. A preferred manner of providing this 1H relative delay is described with respect to FIG. 2.

Referring again to FIG. 1, the combed luminance signal is extracted out from comb filter section 19 by a sensing circuit 23 including floating electrode 24, reset switch 25 and source follower 26. Floating electrode 24 physically overlays section 19 and, in conjunction with reset switch 25 and source follower 26 non-destructively senses the combed luminance signal (to be described in detail later on) and applies it to the input of a sample and hold amplifier 27. Amplifier 27, in response to a sampling signal $\phi_{1D}$ from a clock generator 28, samples the combed luminance signal and provides an amplified version of the combed luminance signal to terminal 29.

Delay lines 18 and 22 are also arranged to maintain a difference in signal delay precisely equal to 1H between samples of the composite video signal applied in parallel to the input of the delay lines from terminal 14. A combed chrominance signal is developed in a comb filter section 21, including a portion of delay lines 18 and 22, and sensed by a sensing circuit 30 including a floating electrode 31, a reset switch 32 and a source follower 33. Floating electrode 31 physically overlays a portion of delay lines 18 and 22 and, in conjunction with reset switch 32 and source follower 33 (as will be described later on with respect to FIGS. 2-5) senses the subtractive combination of the 1H relatively delayed samples of the video signal applied to the input of delay lines 18 and 22 to produce a combed chrominance signal. The combed chrominance signal is applied via source follower 33 to the input of a sample and hold amplifier 34. Sample and hold amplifier 34 is responsive to the sampling signal $\phi_{1D}$ from clock generator 28 for sampling the combed chrominance signal and includes an amplifier arrangement for providing individually buffered and amplified combed chrominance signals to terminals 35 and 36.

A low-pass filter (LPF) 38, coupled to terminal 29, has an amplitude versus frequency characteristic with an upper frequency cutoff of, for example, 4.0 MHz, suitable for passing a wideband version of the combed luminance signal to one input of a signal combiner 40 while rejecting the higher frequency clocking signals of the delay lines. A low-pass filter (LPF) 42, coupled to terminal 35, has an amplitude versus frequency characteristic with a cutoff frequency of, for example, 1.5 MHz suitable for passing relatively low frequency (vertical detail) information of the combed chrominance output signal while rejecting the relatively higher frequency chrominance information and delay line clocking signals. Low-pass filter 42 supplies a vertical detail information signal to a second input of combiner 40. A "restored" luminance signal is generated at the output of combiner 40. This "restored" luminance signal is applied to a luminance signal processor 44 for further amplification and processing.

A bandpass filter (BPF) 46 coupled to terminal 36 has an amplitude versus frequency passband response characteristic centered at the color subcarrier frequency, e.g., at least ±500 kHz from 3.58 MHz for the NTSC system, which is suitable for passing the chrominance signal component of the combed chrominance signal while rejecting the lower frequency luminance component and higher frequency delay line clocking signals. Bandpass filter 46 supplies the chrominance signal to a chrominance signal processor 48. Chrominance signal processor 48 is also supplied with a color burst gating signal derived from the horizontal synchronization signals by a burst gate generator 50.

Chrominance signal processor 48 includes a conventional chrominance subcarrier extractor (not shown) for deriving a color reference signal locked in frequency and phase to the color burst signal which occurs during the color burst gating signal. The color reference signal is used to demodulate the combed chrominance signal to produce color difference signals R-Y, G-Y and B-Y, which are applied to a matrix circuit 51. Matrix circuit 51 also receives the "restored" luminance signal from processor 55 and supplies R, G and B primary color representative signals to kinescope 52. Luminance signal processor 44, burst gate generator 50 and matrix circuit 51 are well known in the television arts and therefore will not be described in detail.

It is noted that electrode 24, which senses the combed luminance signal, is located at a point corresponding to a time delay D, with respect to the direction of signal propagation, from electrode 31 which senses the combed chrominance signal. The time delay D serves to delay the combed luminance signal by a sufficient amount so that the chrominance and luminance components are properly time coordinated at the inputs of matrix 51. In this embodiment, the delay D primarily serves to compensate for chrominance signal delay due to the chrominance band pass filter 46. The delay D, provided within the CCD comb filter arrangement eliminates the need for a conventional discrete luminance delay equalization network (e.g., which may be included in luminance processor 44) for equalizing the luminance and chrominance signal transition times prior to being combined in matrix 51.

In addition, the color reference signal (at 3.58 MHz for the NTSC system) generated within chrominance signal processor 48 is supplied via a terminal 53 to a color subcarrier frequency multiplier (tripler) circuit 54. A suitable multiplier circuit is described in a U.S. Pat. No. 4,325,076 issued Apr. 13, 1982. Clock generator 28 receives the output signal from multiplier circuit 54 having a frequency of $3 \times 3.58$ MHz=10.7 MHz via terminal 56 and develops CCD clock signals $\phi_1$, $\phi_2$, $\phi_{1D}$ $\phi_{2D}$ and $\phi_{2d}$ (shown in FIG. 3) for application to delay lines 18, 20 and 22 to effect charge transfer therein. The application of the clock signals to delay lines 18, 20 and 22 in the vicinity of sensing electrodes 24 and 31 is described with respect to FIG. 2.

An input bias circuit 60, coupled to terminal 14 via a resistor R, is employed to control the direct voltage bias at the input section (not shown) of CCD delay lines 18, 20 and 22, and may be constructed as described in U.S. Pat. No. 4,139,784 issued Feb. 13, 1979 to D. J. Sauer.

In general the construction and operation of the above described FIG. 1 comb filter signal processing circuit is substantially the same as the comb filter signal processing arrangement described in the forementioned Pritchard U.S. Patent. However, in that patent a unity gain signal inverter is required to invert the signal at the input of one of the short delay lines in order that the subsequent charge combination results in a subtractive combination of the 1H relatively delayed signals. As noted earlier it is undesirable to use a signal inverter in the comb filter arrangement because it introduces an envelope delay and an amplitude mismatch between the corresponding signals processed in the long and short delay lines which degrades the signal cancellation performance of the comb filter arrangement. Additionally, the signal inverter provides an input signal to one of the short delay lines which may have a different DC characteristic than the input signal to the other delay line, thus necessitating the use of an additional DC input bias circuit.

In the present apparatus a unity gain signal inverter is not required in order that the comb filter arrangement provide a subtractive combination between the long and short delay lines 18 and 22. Sensing circuit 30, including floating electrode 31, operates as a floating gate subtractor for providing the subtractive combination of the signals in delay lines 18 and 22. The floating gate subtractor used in a CCD comb filter arrangement is advantageous in that it eliminates the need for a unity gain phase inverter for producing an inverted video signal for short delay line 22. Also, since the video signal developed at terminal 14 is directly coupled to each of the inputs of delay lines 18, 20 and 22, the need for a separate input bias circuit for controlling the DC bias for the input of short delay line 22 is avoided. Furthermore, the elimination of the phase inverter greatly improves the phase and amplitude matching between the transferred charges of the individual CCD delay lines resulting in maximum signal cancellation and reinforcement for the luminance and chrominance comb filter arrangement. Additionally, the amplitude and phase delay of an inverter, which are not consistent characteristics from device to device, do not have to be accounted for.

Figures 2, 3:
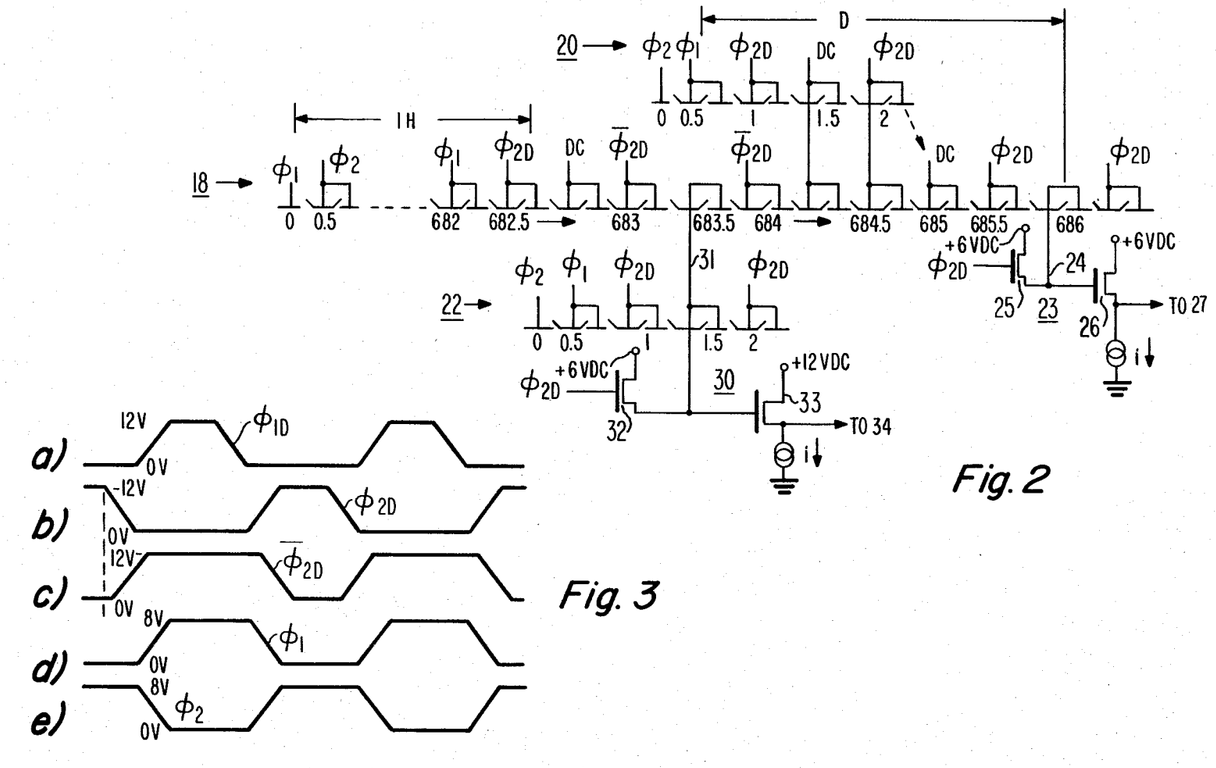
FIG. 2 illustrates in schematic diagram form the electrode structure of a portion of the CCD arrangement of FIG. 1.
FIG. 3 illustrates the clock signal waveforms for the CCD arrangements of FIGS. 1 and 2.

FIG. 2 shows in schematic diagram form the electrode gate structure which overlies the N-type buried channel for each of delay lines 18, 20 and 22, in the vicinity of sense electrodes 24 and 31. The electrodes shown with upcurved ends represent the transfer electrodes, and the straight electrodes represent the storage electrodes. During device fabrication, the CCD channel region under the transfer electrode is provided with a barrier potential relative to the channel region under the storage electrode by means such as ion-implanted barriers, which are well known in the art. This known type of asymmetrical electrode structure results in unidirectional charge propagation from left to right in the arrangements shown in FIGS. 1 and 2 when clocked by two complimentary phase (biphase) signals. Adjacent transfer and storage electrodes are paired and clocked by the same clock signal form gates, alternate gates transferring and storing a charge packet in response to one of the biphase clock signals. Thus, each gate provides a delay corresponding to one half of the period of the 10.7 MHz clock signal. The numbers under each gate represent the cumulative delay at that point.

Figure 1A:
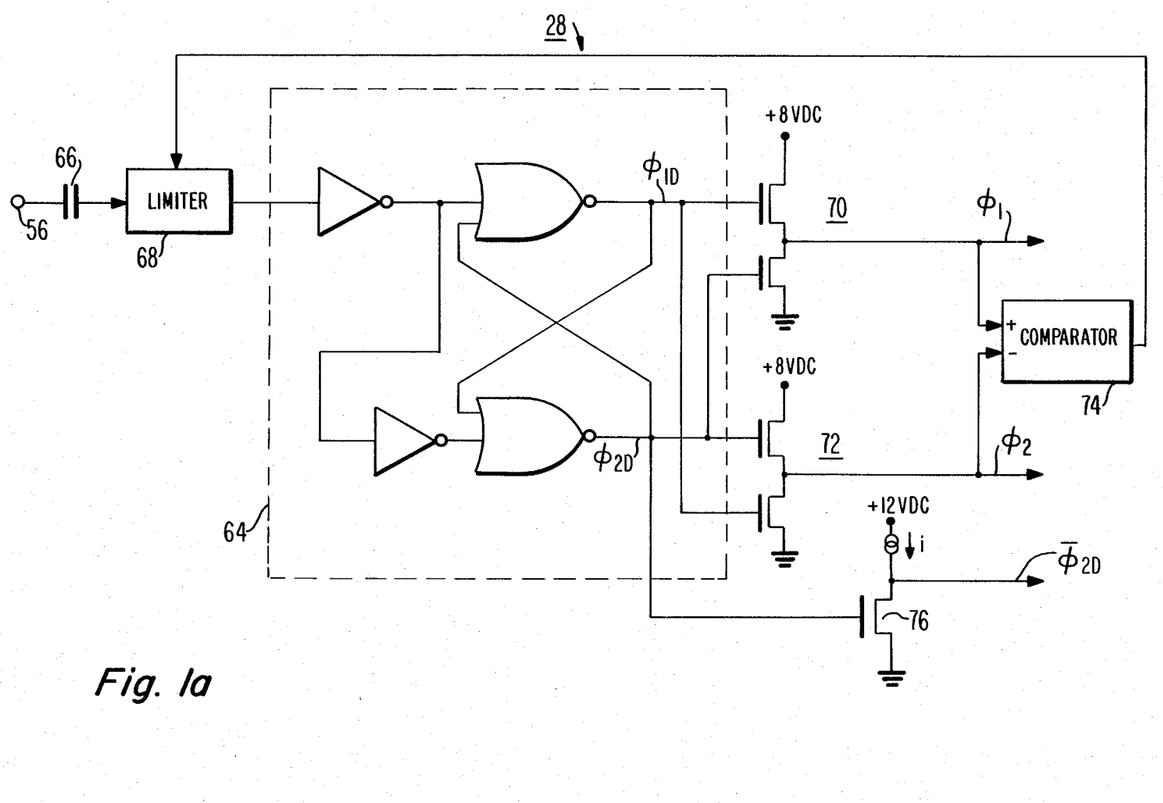

Clock generator 28 generates $\phi_1$, $\phi_2$, $\phi_{1D}$, $\phi_{2D}$ and $\overline{\phi_{2D}}$ (the complement of $\phi_{2D}$) clock signals, shown in FIG. 3, which are applied to the electrode pairs of the gates shown in FIG. 2. As shown in FIG. 1a, clock generator 28 may be constructed using a NOR-gate flip-flop 64 which generates the $\phi_{1D}$ and $\phi_{2D}$ clock signals (FIGS. 3a and 3b) in response to the output signal of frequency multiplier 54 of FIG. 1 which is AC coupled to flip-flop circuit 64 via a capacitor 66 and an input limiter 68. The $\phi_{1D}$ and $\phi_{2D}$ clock signals are coupled to respective inputs of a pair of push-pull circuits 70 and 72, each comprising two FET's of the same conductivity type and having their conduction channels connected in series and driven in a complementary manner for generating at the junction between the FET's of each pair 70 and 72 symmetrical complementary phase clock signals $\phi_1$ and $\phi_2$ (FIGS. 3d and 3e). The push-pull circuits 70 and 72 are powered by an operating voltage source of lower DC potential than the NOR flip-flop circuit 64, resulting in an amplitude level for the $\phi_1$ and $\phi_2$ clock signals which is lower than the amplitude level for the $\phi_{1D}$ and $\phi_{2D}$ clock signals (e.g., 8 volts versus 12 volts). The DC level of the input at limiter 68 relative to its switching threshold determines the clock signal duty cycle and is set by the output signal of phase comparator 74, which is responsive to the $\phi_1$ and $\phi_2$ clock signals. The $\phi_{2D}$ clock signal is also applied to an FET inverter 76 for generating the $\overline{\phi_{2D}}$ clock signal (FIG. 3c).

It is recognized by those skilled in the art that the potential difference between the clock signals applied to adjacent gates must be sufficiently greater than the barrier potential to enable efficient charge transfer within the CCD delay lines. Illustratively, delay lines 18, 20 and 22 are fabricated with a barrier potential of approximately 4 volts. Due to process related factors, a 6 volt minimum potential difference is required between adjacent gates to provide satisfactory charge propagation. The DC amplitude level of the $\phi_1$ and $\phi_2$ clock signals are illustratively 8 volts. This is slightly greater than the minimum DC potential (i.e., 6 volts) sufficient to provide satisfactory charge propagation within each of the CCD delay lines. Since delay line 18 is a substantial portion of the comb filter signal processing arrangement 16 (682 stages), the amplitude of its clock signals ($\phi_1$ and $\phi_2$) are kept close to this minimum acceptable level in order to minimize circuit power requirements. The DC amplitude levels of the $\phi_{1D}$ $\phi_{2D}$ and $\overline{\phi_{2D}}$ clock signals are illustratively 12 volts DC. This voltage is greater than a substantially constant DC voltage (e.g., 6 volts) by an amount corresponding to the 6 volt minimum potential difference required for satisfactory charge transfer, thus providing satisfactory charge propagation within uniphase clocked portions of CCD delay lines 18, 20 and 22, as next described.

Referring to FIG. 2, delay lines 18, 20 and 22 begin with an input gate structure (referred to as 18a, 20a and 22a in FIG. 1 but not shown in FIG. 2) coupled in parallel to terminal 14 suitable for transferring into the delay lines charge packets representative of the composite video signal, in accordance with the well known "fill and spill" technique, such as described in the forementioned U.S. Pat. No. 4,139,784.

After the input section, each of delay lines 18, 20 and 22 are biphase clocked using the $\phi_1$ and $\phi_2$ clock signals and, in the vicinity of floating electrodes 24 and 31, are converted to uniphase clock operation in order to facilitate signal combination, as will be described below. In uniphase clock operation only alternate gates are clocked; the adjacent gates being held at a substantially constant DC votage level intermediate the DC voltage excursions of the clock signals applied to the clocked gates in order that the applied potential difference between the gates is at least the minimum voltage required for satisfactory charge prapogation.

Delay line 18 is biphase clocked up to gate 683 and starts with a $\phi_1$ clock at gate 0 and continues in an alternating pattern of $\phi_1$ and $\phi_2$ clocking until gate 682. Gates 682.5 and 683 have the $\phi_{2D}$ and $\overline{\phi_{2D}}$ clock signals, respectively, applied. Between gates 683 and 684, in the vicinity of floating electrode 31, delay line 18 is clocked in a uniphase manner with $\overline{\phi_{2D}}$. After gate 684, in the vicinity of floating electrode 24, delay line 18 is clocked in a uniphase manner with $\phi_{2D}$.

Delay lines 20 and 22 start with biphase clocking, with a $\phi_2$ clock signal applied at gate 0. However, after gates 0.5 they are uniphase clocked with $\phi_{2D}$. Note also that gate 682.5 of delay line 18 is clocked with $\phi_{2D}$ which is of substantially the same phase as the $\phi_2$ clock signal applied to gate 0 of delay lines 20 and 22. This results in precisely 682.5 additional gates which the charge packets of the video signal must be clocked through within delay line 18 as compared with delay lines 20 and 22. As previously noted, these additional gates provide precisely 1H of differential delay between delay lines 18 and 20, 22.

Figure 4:
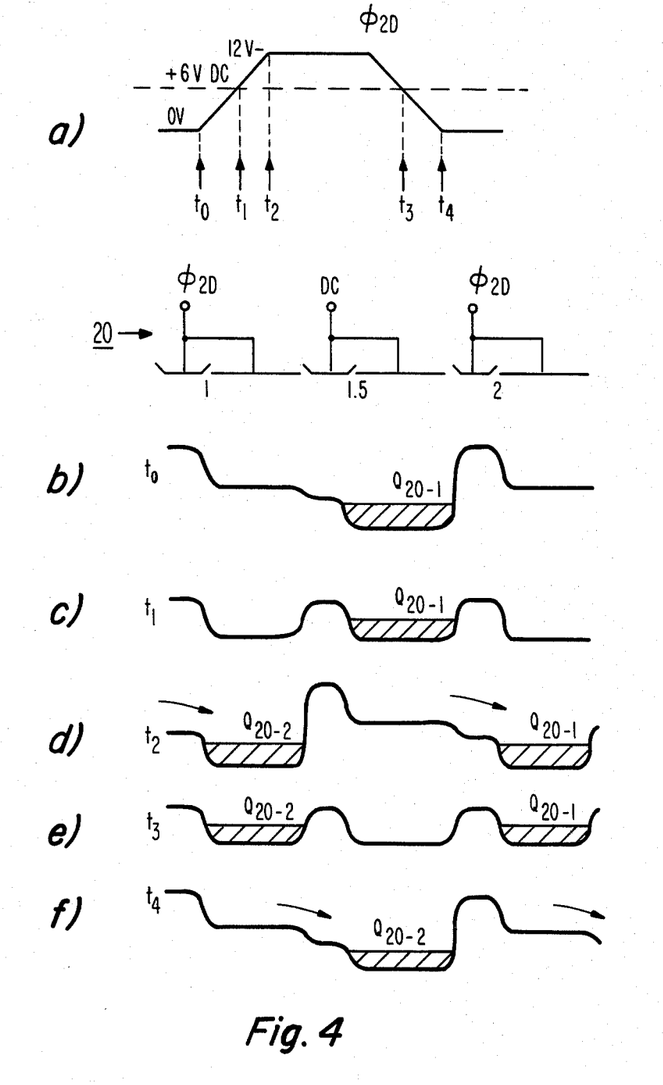
FIGS. 4a to 4f illustrate potential well diagrams useful for explaining the operation of a portion of the CCD arrangements of FIGS. 1 and 2.

Uniphase clocking will next be described with reference to the uniphase portion of delay line 20 reproduced in FIG. 4. The $\phi_{2D}$ uniphase clock is applied to gates 1 and 2. A DC voltage (e.g., 6 volts) is applied to gate 1.5. The potential difference between the minimum and maximum DC levels of the $\phi_{2D}$ clock and the 6 volt DC voltage applied to gate 1.5 is equal to the minimum potential (6 volts) required for satisfactory charge propagation. Thus, charge packets within delay line 20 ($Q_{20}$) propagate through delay line 20 as illustrated in FIGS. 4b through 4f at various times $t_0$ through $t_4$ indicated in FIG. 4a. At time $t_0$ the DC level of the $\phi_{2D}$ clock pulse is at 0 volts, creating relatively shallow potential wells under gates 1 and 2. Thus, a first charge packet representative of a sample of the composite video signal, $Q_{20-1}$, is located at the deeper potential well under the storage electrode of gate 1.5, since it has a DC voltage of 6 volts applied, creating a voltage differential between its adjacent gates which is equal to the minimum potential differential required for efficient charge transfer (i.e., 6 volts) This is illustrated in FIG. 4b.

FIG. 4c illustrates the potential well diagram at time $t_1$, when the $\phi_{2D}$ clock is at 6 volts. At this time the DC potential applied to each of gates 1, 1.5 and 2 are all the same and the potential wells formed under their respective transfer and storage electrodes are of equal depth. Thus, the charge $Q_{20-1}$ does not propagate. FIG. 4d illustrates the potential well diagram at time $t_2$, when the $\phi_{2D}$ clock is at 12 volts. At this time, the deeper potential wells are those located under the clocked gates 1 and 2, while the potential wells located under gate 1.5 are more shallow. Thus, the next charge packet of the composite video signal, $Q_{20-2}$, enters from the left to be under gate 1 and charge $Q_{20-1}$ propagates one stage to the right (i.e., later in time) and resides under gate 2. At time $t_3$ the corresponding potential well diagram, FIG. 4e, is the same as FIG. 4c, since the voltage levels aplied to all the gates are of equal amplitude (i.e., 6 volts). Similarly, at time $t_4$, the potential well diagram FIG. 4f is the same as FIG. 4b since now the clocked gates have 0 volts applied to them and the deeper potential wells are located under the electrodes of the DC gate, 1.5. Thus, the second charge $Q_{20-2}$ propagates one stage to the right and resides under gate 1.5. Charge $Q_{20-1}$ also propagates one stage to the right, where it additively combines with the charge from delay line 18, as described later.

The clocking of the charges within delay line 22 is the same as that described above with respect to delay line 20. However, the DC voltage in the uniphase portion of line 22, at gate 1.5 is applied via reset switch 32 and floating electrode 31, to be described more fully later.

Delay line 18, as previously noted, is biphase clocked for gates 0 through 682.5 setting up a 1H relative delay between delay lines 18 and 20, 22. Gate 683 has a $\overline{\phi_{2D}}$ clock applied to it and the gate between gates 682.5 and 683 has a DC voltage (6 volts) applied to it. Since at a time when the $\phi_{2D}$ clock is at 0 volts the $\overline{\phi_{2D}}$ clock is at 12 volts, a shallow potential well is developed under gate 682.5, an intermediate depth potential well is developed under the adjacent DC gate and deeper potential well is developed under gate 683. As a result, charge propagates from gate 682.5 directly across the DC gate (as indicated by an arrow) to gate 683. This type of charge transfer "skews" the signal processing timing with respect to delay line 22. This skewing helps set up the proper charge transfer in delay lines 18 and 22 for enabling sensing circuit 30 to perform a subtractive signal combination.

Sensing circuit 30 applies the uniphase DC voltage (6 volts) to gate 1.5 of delay line 22 and gate 683.5 of delay line 18. Specifically, floating electrode 31 is connected to the gate electrode of source follower NMOS transistor 33. Source follower 33 has its drain electrode coupled to a source of operating potential (+12 volts) and its source electrode coupled to amplifier 27 and to ground via a constant current source (i). Reset switch NMOS transistor 32 has a gate electrode coupled to receive the $\phi_{2D}$ clock signal, its source electrode coupled to a source of operating potential (+6 volts) and its drain electrode coupled to floating electrode 31. Illustratively, the turn-on threshold ($V_T$) for NMOS transistor 32 is 1.2 volts. Thus, when the positive-going portions of the $\phi_{2D}$ clock signal exceed the source voltage by 1.2 volts i.e., (it reaches +7.2 volts) transistor 32 is conductive and electrode 31 is clamped to +6 volts DC. When the DC level of the $\phi_{2D}$ clock signal falls below +7.2 volts, it becomes non-conductive and electrode 31 is not clamped. Source follower 33 DC isolates electrode 31 so that when electrode 31 is not clamped, it floats at +6 volts and any voltage variations sensed by electrode 31 due to charge packets transferring underneath are applied via the source electrode of source follower 32 to amplifier 27. Thus, except for a small DC voltage variation caused by the charge packets passing underneath gates 1.5 and 683.5, the DC voltage at electrode 31 acts as the uniphase constant DC voltage.

It is required that reset switch 32 finish unclamping electrode 31 when its gate potential ($V_g$) equals the uniphase clock voltage ) in order that electrode 31 sense the subtraction of the 1H relatively delayed signals. That is, transistor 32 must be off when $Vg = V_{DC}$. If the source electrode of reset switch transistor 32 is coupled to an operating potential $V_{RS}$, for an N channel arrangement, $V_T$ must be less than $V_{DC} - V_{RS}$ and for a P channel arrangement $V_T$ must be greater than $V_{DC} - V_{RS}$ for proper operation.

As shown in FIG. 2, in the vicinity of electrode 31, delay line 18 is uniphase clocked with the $\overline{\phi_{2D}}$ clock signal and delay line 22 is uniphase clocked with the $\phi_{2D}$ clock signal. This opposite phase uniphase clocking allows electrode 31 to sense the subtractive combination of the signals within delay lines 18 and 22 as will now be described with reference to FIG. 5.

Figure 5:
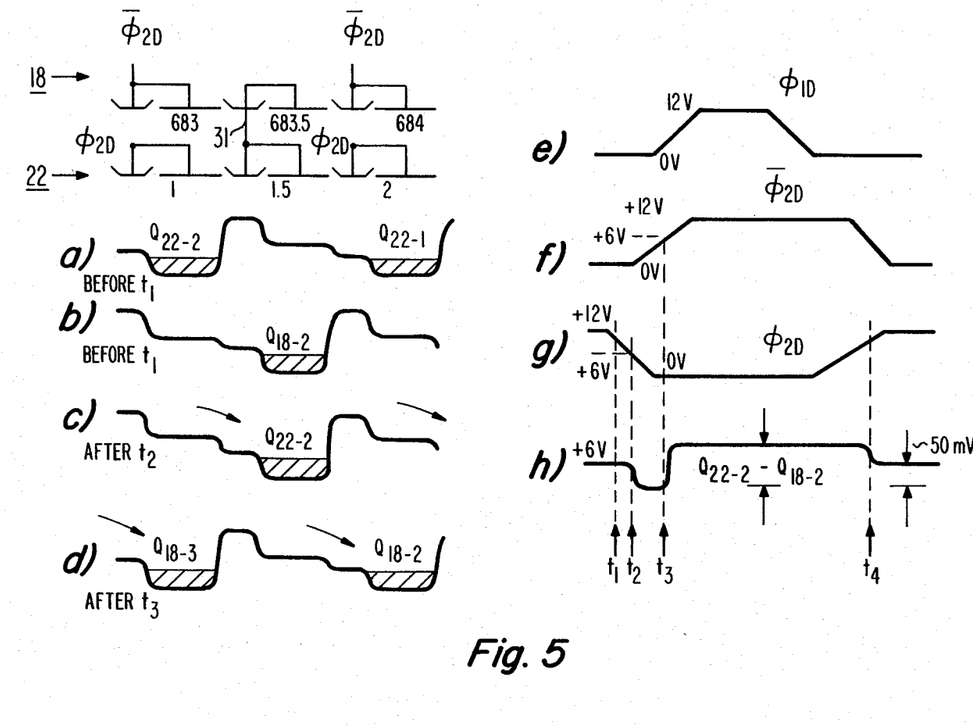
FIGS. 5a through 5h illustrate potential well diagrams and waveforms useful in explaining the operation of another portion of the CCD arrangements of FIGS. 1 and 2.

In FIG. 5, delay lines 18 and 22 in the vicinity of floating electrode 31 are reproduced and potential well diagrams a, b, c and d are shown thereunder. Waveforms e, f and g show in greater detail $\phi_{1D}$, $\overline{\phi_{2D}}$ and $\phi_{2D}$ clock signals and waveform h illustrates the DC voltage variations sensed by floating electrode 31.

Before time $t_1$, indicated in FIG. 5g the amplitude level of the $\phi_{2D}$ clock applied to reset switch 32 is above the DC turn on level (7.2 volts) for the NMOS transistor of reset switch 32, causing switch 32 to clamp electrode 31 to 6 volts. Furthermore, before time $t_1$, when the amplitude level of the $\phi_{2D}$ clock signal is greater than 6 volts (i.e., 12 volts), for delay line 22 a deeper potential well is formed under gates 1 and 2 than under gate 1.5 (which has 6 volts applied to it from floating electrode 31). This condition is illustrated in FIG. 5a, showing first and second charge packets $Q_{22-1}$ and $Q_{22-2}$ residing under gates succeeding and preceding floating gate 1.5, i.e., gates 2 and 1, respectively. Additionally, before time $t_1$ the amplitude level of the $\overline{\phi_{2D}}$ clock signal is less than 6 volts (i.e., 0 volts) causing for delay line 18 shallow potential wells under gates 683 and 684 and deeper potential wells under gate 683.5, which has 6 volts applied to it from floating electrode 31. This condition is illustrated in FIG. 5b. Due to the previously described "skewed" timing between delay lines 18 and 22, a first charge packet $Q_{18-1}$, corresponding to a charge packet having a 1H relative delay from $Q_{22-1}$, resides under gate 684.5 (of FIG. 2) and a second charge packet $Q_{18-2}$, corresponding to a charge packet having a 1H relative delay from $Q_{22-2}$, resides under floating gate 683.5.

Beginning at time $t_2$ indicated in FIG. 5g, the amplitude level of the $\phi_{2D}$ clock signal becomes less than 6 volts, causing for delay line 22 progressively shallower potential wells under gates 1 and 2 than under gate 1.5 (which has 6 volts applied to it from floating electrode 31). The net result is illustrated in FIG. 5c in which charge $Q_{22-2}$ has propagated one stage to the right and resides under floating gate 1.5. The effect of charge $Q_{22-2}$ in this position, is to slightly reduce the DC voltage level at floating electrode 31, as illustrated in FIG. 5h. Note, that since the amount of reduction in DC voltage level is in the order of millivolts, the vertical scale of FIG. 5h is expanded to clearly show this effect.

Beginning at time $t_3$ the amplitude of the $\overline{\phi}_{2D}$ clock signal becomes greater than 6 volts, creating progressively deeper potential wells under gates 683 and 684 of delay line 18 than under gate 683.5. The net result is illustrated in FIG. 5d in which charge packet $Q_{18-2}$ has propagated one stage to the right and resides under the deeper potential well of gate 684 which succeeds floating gate 683.5 and a third charge packet $Q_{18-3}$ resides under gate 683 which precedes floating gate 683.5. The effect on electrode 31 of the removal of charge $Q_{18-2}$ from under floating gate 683.5 is to slightly raise the DC voltage level sensed by floating electrode 31. This is illustrated in FIG. 5h for the condition where the charge packet in delay line 18) was of a greater magnitude than the corresponding charge packet within delay line 22. The change in voltage level at floating electrode 31 represents (in absolute value) the subtractive combination between the corresponding charge packets of delay lines 18 and 22 (i.e., $Q_{22-2} - Q_{18-2}$). Note, this subtractive combination occurs at a time when charge is being transferred into gate 684 of delay line 18 and gate 1.5 of delay line 22, thus establishing a 682.5 gate differential between the corresponding charges of each line, which, as previously noted, results in precisely a 1H differential delay. Consequently, the voltage variations sensed by electrode 31 represent the combed chrominance signal, which is applied via source follower 33 to the signal input of sampling amplifier 34.

It should be noted that in the present arrangement the decreasing voltage level of the same clock signal $\phi_{2D}$, is used to perform two functions which must be properly sequenced to allow efficient operation of the floating gate subtractor. Firstly, the $\phi_{2D}$ clock signal is used to unclamp floating electrode 31 at time $t_1$, when its amplitude falls below the previously noted 7.2 volt turn-on threshold of NMOS reset transistor 32. Secondly, the $\phi_{2D}$ clock signal is used to initiate charge transfer in under electrode 31 within delay line 22 at time $t_2$, when its amplitude falls below 6 volts, causing progressively shallower potential wells under gates 1 and 2 than under gate 1.5. Since the falling edge of the $\phi_{2D}$ clock signal has an amplitude excursion which includes the necessary DC voltage levels necessary to perform these functions, it synchronizes or "self-times" these functions with respect to each other. Because of this self-timing, an additional clocking signal customarily referred to as $\phi_{reset}$ is not required for periodically clamping the floating electrode.

Furthermore, since delay line 18 is clocked by an inverted $\overline{\phi}_{2D}$), the rising edge of its clock signal necessarily occurs a short time after the falling edge of the $\phi_{2D}$ clock signal of delay line 22 (as determined by the time delay presented by the $\phi_{2D}$ signal inverter 76 of FIG. 1a). Thus, since the $\overline{\phi}_{2D}$ clock signal increases above 6 volts, initiating charge transfer out from under electrode 31 at time $t_3$ a short time after the $\phi_{2D}$ clock signal falls below 6 volts, which initiates charge transfer in under electrode 31 at time $t_2$, the time delay between charge transfers under electrode 31 is also minimized. Consequently, the time duration which can be used for sampling the subtractive combination is maximized. This maximum sampling time period is the time duration between time $t_3$ and a time $t_4$, shown in waveform 5h. At time $t_4$ the amplitude of the $\phi_{2D}$ clock signal has increased to 7.2 volts, thus reaching the turn-on voltage for reset switch 32 which again clamps electrode 31 to 6 volts DC. The $\phi_{1D}$ clock signal (FIG. 5e) serves as an appropriate sampling signal for sampling amplifiers 27 and 34 of FIG. 1.

As previously noted with reference to FIG. 5b, charge $Q_{18-1}$ had passed to gate 684.5 (of FIG. 2) by time $t_1$. This charge bypasses the DC gate shown in FIG. 2 between gates 684 and 684.5 for the same reason previously discussed with respect to the DC gate between gates 682.5 and 683.

With the above in mind, referring to FIGS. 2 and 5, during the next uniphase clock cycle, when the $\phi_{2D}$ clock which is applied in common to gates 2 and 684.5 of delay lines 20 and 18 is at 0 volts, charge $Q_{18-1}$ advances to gate 685, and the corresponding charge, $Q_{20-1}$, also advances to gate 685 (due to the previously noted merger of delay lines 18 and 20).

Note, the gate differential between the corresponding charge packets (i.e., $Q_{18-1}$ and $Q_{20-1}$) of delay lines 18 and 20 at the point of charge combination is 682.5 (i.e., 685 less 2.5). Since 1H relatively delayed charges from delay line 18 and 22 both arrive at gate 685 at the same time, additive combination results, generating the previously mentioned combed luminance signal.

The combined charges representative of the combed luminance signal propagate in a uniphase manner within delay line 18 and under gate 686. Sensing circuit 23, including floating electrode 24 coupled to gate 686, senses the combed luminance signal passing thereunder and applies the combed luminance signal via the output of source follower 26 to the input of sample and hold amplifier 27.

The time delay D between the sensed combed chrominance signal and sensed combed luminance signal as shown in FIG. 2 corresponds to 2 stages (686 less 684). A lesser or greater delay can be provided between the sensed signals by coupling floating electrode 24 to a gate located earlier or later in time along delay line 18.

While in the illustrative preferred embodiment shown in FIG. 2, floating electrode 24 is used for sensing the combed luminance signal, it will be appreciated that an isolated diffusion area within delay line 18 (such as described at pages 52-56 of the book entitled "Charge Transfer Devices" by Sequin and Tompsett published in 1974 by Academic Press, Inc.) can also be used for signal sensing. It is believed, however, that the use of the floating electrode for recovering the combed luminance signal is desirable, since its geometry presents parasitics similar to the parasitics presented by floating electrode 31 used to sense the combed chrominance signal and thus improves the match between the amplitude and phase characteristics of the delay lines.

Figure 6:
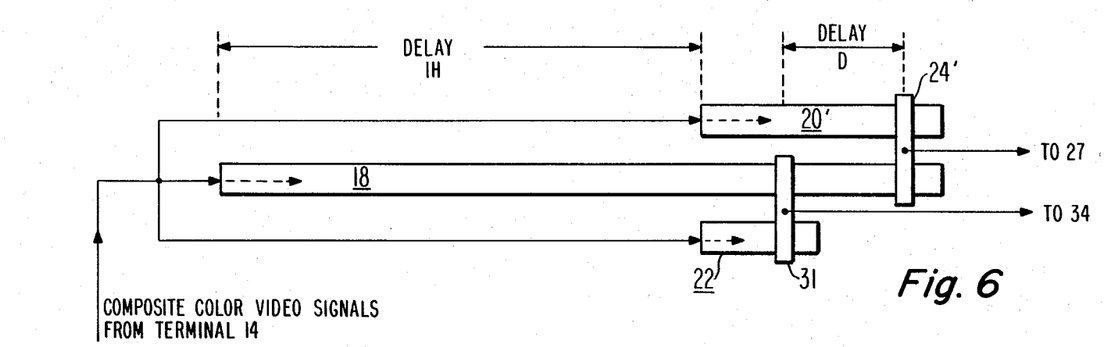
FIG. 6 illustrates an alternative embodiment of the CCD arrangement of FIG. 1 also constructed in accordance with principals of the present invention.

Similarly, a floating electrode can be used to additively combine delay lines 18 and 20 instead of the channel merging arrangement shown in FIGS. 1 and 2. FIG. 6 shows a CCD delay line arrangement similar to that shown in FIGS. 1 and 2. However, a delay line 20' has an extended uniphase region with the gates thereof arranged like gates 1, 1.5 and 2 of line 20 in the structure of FIG. 2 and a floating electrode 24' overlaps both of delay lines 18 and 20' rather than just delay line 18.

Electrode 24' is part of a sensing circuit similar to that used for electrode 24 of FIG. 1, and overlaps delay line 20' at a set of electrodes within its uniphase arrangement which, in FIG. 2, would have had applied to it a DC potential (e.g., gate 2.5, not shown). Thus, at electrode 24' both delay lines 18 and 20' have a uniphase structure, both use the same uniphase clocking signal $\phi_{2D}$ and the differential delay between the lines is precisely 1H (e.g., 685 less 2.5=682.5). Consequently, floating electrode 24' senses an additive combination of the charge packets passing underneath electrode 24' and its voltage variations represent a combed luminance signal which is applied via source follower 26 to sample and hold amplifier 27.

While the comb filter arrangement of FIG. 1 includes three CCD delay lines, a floating gate subtraction arrangement allows for the construction of a comb filter structure with only two delay lines and therefore only two inputs. Such a structure is shown in FIG. 7.

Figure 7:
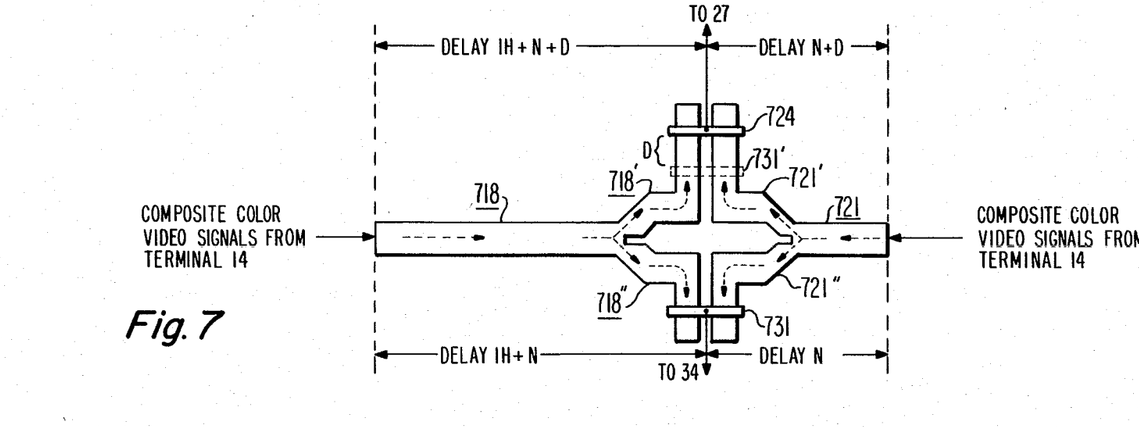
FIG. 7 illustrates another alternative embodiment of the CCD arrangement of FIG. 1 also constructed in accordance with principals of the present invention.

In FIG. 7, only two delay lines 718 and 721 are employed. As in the previously described comb filter arrangements, the differential delay between the delay lines is still maintained at precisely 1H. Specifically, from the input of delay line 718 to a floating electrode 731 there are a number of gates corresponding to a delay incrementally greater than 1H, i.e., 1H+N; and, from the input of delay line 721 to floating electrode 731 there are a number of gates corresponding to the incremental delay, N. The video signal inputs (terminal 14) to delay lines 718 and 721 are each sampled using an opposite phase of a biphase clock signal so that at electrode 731 charge packets of delay lines 718 and 721 combine with a differential delay of precisely 1H. Similarly, from the input of delay line 718 to a floating electrode 724 there are a number of gates corresponding to a delay of 1H+N+D (D being the same as in the previous embodiments); and, from the input of delay line 721 to electrode 724 there are a number of gates corresponding to a delay of N+D. Thus, at electrode 724 charge packets of delay lines 718 and 721 also combine with a differential delay of precisely 1H.

Delay line 718 is split into two portions shown as 718' and 718''. In a similar manner, delay line 721 is split into two portions, 721' and 721''. Floating electrode 724 overlaps a uniphase clocked portion of each of delay lines 718' and 721' in a manner similar to the overlap of floating electrode 24' over the uniphase portions of delay lines 18 and 20' of FIG. 6. Thus, floating electrode 724 is used to sense the combed luminance signal. Similarly, floating electrode 731 senses a combed chrominance signal in a manner similar to the sensing of the combed chrominance signal by floating electrode 31 of FIG. 6. Since only two delay lines are used only two signal-to-charge input sections, one for each line, are required. This results in a saving of the silicon area occupied by one signal-to-charge input section and a reduction in the coupling of control signals to that input section for controlling its operation.

Alternatively, delay lines 718'' and 721'' and floating electrode 731 can be eliminated and a floating electrode 731' can overlie delay lines 718' and 721' in a manner similar to electrode 731 such as shown in dashed lines in FIG. 7, thus eliminating the need for charge splitting.

The previously described comb filter signal separation arrangements were all of the so-called "1H" type. However, the principles of the present invention can aso be applied to a "2H" comb filter arrangement.

Figures 8A, 8B, 8C:
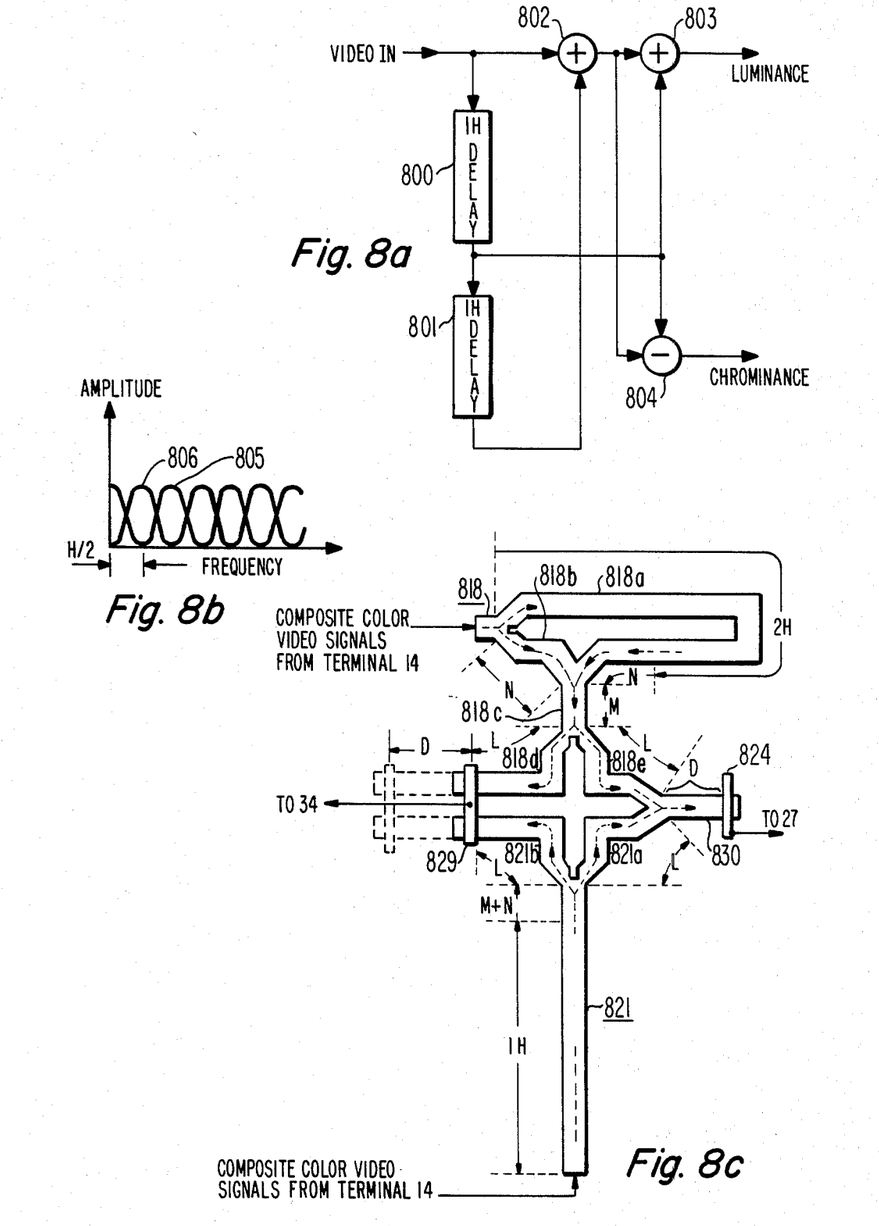
FIGS. 8a, 8b and 8c relate to another embodiment of a CCD comb filter arrangement also constructed in accordance with principals of the present invention.

FIG. 8a illustrates in block diagram form a conventional 2H comb filter arrangement. A composite video signal is applied to the input of a 1H delay line 800 and an input of an additive signal combiner 802. The output of the 1H delay line 800 is coupled to the input of a second 1H delay line 801, and to inputs of an additive signal combiner 803 and a subtractive signal combiner 804. The output of the second 1H delay line 801 is coupled to a second input of the additive combiner 802, the output of which is coupled to second inputs of combiners 803 and 804.

The combiner 802 combines video signals which are delayed from each other by two line intervals (2H). These signals contain chrominance information in phase synchronism due to the two line delay. The combined signal produced by combiner 802 is additively combined with a 1H delayed signal in combiner 803 to develop an offset sinusoidal amplitude versus frequency response characteristic for providing the combed luminance signal at the output of the combiner 803, shown as waveform 805 in FIG. 8b. Like the response characteristic of the 1H comb filter of FIG. 1, the offset sinusoidal characteristic of the FIG. 8a 2H comb filter provides minimum attenuation at zero Hz, and repetitive signal nulls at odd integer multiples of one-half the line scanning frequency.

In a complementary manner, the subtractive combiner 804 causes reinforcement of the chrominance components of the applied signals and cancellation of the interleaved luminance signal components. The resultant chrominance amplitude versus frequency response characteristic is shown as waveform 806 in FIG. 8b. The response characteristic of waveform 806 also exhibits an offset sinusoidal shape, with nulls beginning at zero Hz and recurring at even integer multiples of one-half the line scanning frequency. An advantage of this type of sinusoidal response characteristic is that it provides broader combing in the vicinity of the signal null frequencies, and therefore greater attenuation of the signals to be removed. Additionally, the broader combing provided by the 2H comb filter allows a greater frequency variation of the clock signal without perceptible combing function degradation.

As in the case of the 1H comb filter arrangements, the amplitude of the signals at the point of combination must be precisely matched in order to provide a maximum amount of signal combing. In this regard, the signals applied to the additive combiner 802 are caused to exhibit one-quarter amplitudes relative to the combed output signals of combiners 803 and 804. Their combination will thus provide half-amplitude signal levels. The output signals of the first delay line 800 are caused to exhibit half-amplitudes relative to the combed output signal levels, resulting in the application of half-amplitude signals to combiners 803 and 804. The combed output signals produced will therefore exhibit nominally unity amplitudes with maximum cancellation at the response characteristic null frequencies.

In order to implement such a 2H comb filter for separating the frequency interleaved components of a composite video signal in a CCD format, one could provide a single biphase clocked CCD delay line having a number of stages corresponding to a 2H delay. However, when the clock frequency is proportional to an odd multiple of one-half the line scanning frequency, charge packets will not exist in the delay line which are separated by precisely 1H of delay. As previously noted, a 1H delay corresponds to a fractional proportion of the clock frequency period (i.e., 682½ clock frequency periods or delay stages when clocking at three times the subcarrier frequency in the NTSC system) however charge packets within the CCD delay line are separated by integer multiples of the clock frequency period. Thus, it would not be possible to have a tap at the midpoint of such a 2H delay line to provide charge packets which are relatively delayed by precisely 1H in order to implement a comb filter arrangement such as shown in FIG. 8a, wherein 1H relatively delayed charge packets would be required as inputs to combiners 803 and 804.

Analog signal processing of the charge packets provided at the tap, such as a sample and hold circuit, would be required to provide an additional fractional delay in order that the signals are combined with precisely a 1H relative delay.

Furthermore, it will be appreciated by those skilled in the art, that for the same reasons, two CCD delay lines, each providing precisely 1H of relative delay could not be charge-coupled directly in series. Thus, the 1H delay lines 800 and 801 of the FIG. 8 a 2H comb filter arrangement could not be readily implemented in CCD format without additional signal processing between the output of delay line 800 and the input of delay line 801.

In both of the above-mentioned possible CCD 2H comb filter arrangements, charge packet combination could not be accomplished within the CCD sampled data format. As previously noted with respect to the foremand Pritchard patent, analog signal processing may introduce envelope delay and amplitude mismatch between the delay lines and consequently the charge packets within the lines, which results in a degradation of the signal separation characteristics of the comb filter.

In accordance with the principles of the present invention, FIG. 8c shows a charge subtraction CCD delay line 2H comb filter. The 2H comb filter consists of only two CCD delay lines 818 and 821 which are constructed and operate substantially the same as the previously described CCD delay lines.

After an input section (not shown) the charge packets within delay line 818 are split into two equal magnitude portions between delay line portions 818a and 818b. Such known CCD charge splitting is described at page 61 of the aforementioned book by Séquin and Tompsett. After a number of gates corresponding to a delay N for delay line 818b and a number of gates corresponding to a delay of 2H+N for delay line 818a, the lines are merged together to form delay line portion 818c, where the charge packets are added. Since the differential delay between these delay line portions at the point of merger is precisely 2H, i.e., 2H+N−N, these delay line portions correspond to the 1H delay lines 800 and 801 of FIG. 8a and the point of merger corresponds to the additive combiner 802. After a number of gates corresponding to a delay M, delay line portion 818c splits into two portions 818d and 818e wherein the charge packets are again divided into two equal magnitude portions.

Similarly, after an input section (not shown) and a number of gates corresponding to a delay of 1H+M+N, the charge packets within delay line 821 are split into two equal magnitude portions between delay line portion 821a and 821b. The equal magnitude portions of charge packets within these delay line portions are combined with the corresponding equal magnitude portions of charge packets from delay line portions 818e and 818d, respectively, and sensed by floating electrodes 824 and 829 to form the combed chrominance and luminance signals in a manner similar to the charge packet combination previously described with respect to FIG. 7.

More specifically, delay line portions 818e and 821a are uniphase clocked, and after a number of gates corresponding to a delay L, merge to form a delay line portion 830. At the point of merger, the charge packets have a relative delay of 1H[(2H+L+M+N)−(1H+L+M+N)], thus corresponding to an additive signal combination, such as provided by combiner 803 of FIG. 8a. After a number of gates corresponding to the previously referred to delay D, floating electrode 824 (similar to electrode 24 of FIG. 1) overlaps delay line portion 830 and senses the combed luminance signal.

Similarly, delay line portion 818d and 821b have a number of gates corresponding to a delay of L and are uniphase clocked with the timing of one portion "skewed" one-half cycle ahead of the other portion. Thus, at floating electrode 829 (similar to electrode 29 of FIG. 1) a subtractive combination of the charge packets passing thereunder results in the sensing by electrode 829 of the combed chrominance signal. Therefore, electrode 829 corresponds to the subtractive combiner 804 of FIG. 8a.

In an alternative embodiment, the additive combining provided by the merger of delay line portions 818e and 821a could also be performed using a floating electrode overlapping both of delay line portions 818e and 821a in a manner similar to electrode 724 of FIG. 7.

Alternatively, delay line portions 818e, 821a and 830 can be eliminated and the uniphase portions of delay line portions 818d and 821b extended, as shown in dashed lines in FIG. 8c. Floating electrode 824 can overlap both delay lines 818d and 821b for providing the additive combination representative of the combed luminance signal. Note that a number of gates corresponding to the forementioned delay of D is maintained between floating electrodes 824 and 829.

Thus, the principles of the present invention provide for a CCD delay line comb filter video signal separation circuit which has a common signal input to the delay lines, thus reducing input circuitry requirements and complexity; and, which provides at the output of the delay lines, without the use of external analog signal processing circuitry, the combed luminance and chrominance components of the video input signal.

Although the invention has been disclosed in terms of particular embodiments, further embodiments can be devised by those skilled in the art without departing from the scope of the invention.

For example, the frequency of the clock signals is not limited to 10.7 MHz and can be, e.g., at four times the color subcarrier frequency, i.e., 14.3 MHz for an NTSC signal. In this instance, a differential delay provided by 910 delay stages instead of 682½ delay stages would be required. Whenever clock signals are used which provide the required delay with an integer number of stages, a signal-to-charge input coupling structure having a single input responsive to the composite video signal can be used for generating the charge packets. The input structure can employ charge splitting for providing first and second inputs for coupling the charge packets to the inputs of the delay lines, e.g., line 718 and 721 of FIG. 7 and lines 818 and 821 of FIG. 8.

What is claimed is:

1. A comb filter for processing a composite video signal containing image representative luminance and chrominance components in a horizontal scanning interval, said luminance and chrominance components disposed within a frequency spectrum in an interleaved relation, said chrominance components alternating in phase between consecutive horizontal intervals, comprising:

a substrate;

a first delay line including a first channel formed in said substrate;

a second delay line including a second channel formed in said substrate;

a floating gate overlying both of said first and second channels;

said first delay line also including a first number of gates overlying said first channel between a first gate thereof and said floating gate;

said second delay line also including a second number, different from said first number, of gates overlying said second channel between a first gate thereof and said floating gate;

first and second input means each responsive to said composite video signal for coupling charge packets representing samples of said composite video signal to said first and second channels, respectively;

means for applying clock signals to said gates of said first and second delay lines for transferring said charge packets under said gates so that the charge packets of one of said first and second delay lines arrive under said floating gate delayed in time with respect to the charge packets arriving under the gate preceding said floating gate of the other of said first and second delay lines by an amount equal to an integer multiple of said horizontal scanning interval; and means responsive to said clock signals for periodically clamping said floating gate to a reference potential to sense a voltage at said floating gate when not clamped to said reference potential which is representative of a subtractive combination of said charge packets under said floating gate and said charge packets under said gate preceding said floating gate and thereby representative of said chrominance components of said composite video signal.

2. The comb filter as set forth in claim 1 further including a single bias circuit for applying a common DC bias voltage to each of said first and second input means.

3. The comb filter as set forth in claim 1 further including:

a third delay line including a third channel formed in said substrate, said third channel merging with said first channel at a point and including a third number, different from said first number, of gates overlying said third channel between a first gate thereof and said point of merger;

said first delay line also including a fourth number of gates overlying said first channel, adjacent to said first number of gates and between said floating gate and said point of merger;

third input means responsive to said composite video signal for coupling charge packets representing samples of said composite video signal to said third channel;

means for applying clock signals to said fourth number of gates of said first delay line and said third number of gates of said third delay line for transferring said charge packets under said gates so that the charge packets of said first and third delay lines arrive at said point of merger substantially simultaneously and additively combine thereat; said arriving charge packets of said first delay line being relatively delayed in time with respect to said arriving charge packets of said third delay line by an amount corresponding to said integer multiple of said scanning interval and thereby representative of said luminance components.

4. The comb filter as set forth in claim 3 wherein said means for applying clock signals applies the same clock signal to a gate of each of said first and third channels immediately preceding said point of merger so as to cause the charge packets of each of said delay lines to arrive at said point of merger at substantially the same time.

5. The comb filter as set forth in claim 3 or 4 further including:

a second floating gate overlying said first channel;

said first channel also including a fifth number of gates overlying said first channel adjacent said fourth number of gates and between said point of merger and said second floating gate;

means for applying clock signals to said fifth number of gates of said first delay line for transferring said additively combined charge packets from said point of merger to said second floating gate; and means responsive to said clock signals for periodically clamping said second floating gate to a reference potential to sense a voltage at said second floating gate when not clamped to said reference potential which is representative of said additively combined charge packets and thereby representative of said luminance components of said video signal, said fourth and fifth number of gates establishing a predetermined time delay between said sensed luminance and chrominance components.

6. The comb filter as set forth in claim 1 further including:

a third delay line including a third channel formed in said substrate;

a second floating gate overlying both said first and third channels;

said third delay line also including a third number, different from said first number, of gates overlying said third channel between a first gate thereof and said second floating gate;

said first delay line also including an additional number of gates overlying said first channel adjacent said first number of gates and between said first and second floating gates;

third input means responsive to said composite video signal for coupling charge packets representing samples of said composite video signal to said third channel;

means for applying clock signals to said additional number of gates of said first delay line and said third number of gates of said third delay line for transferring charge packets under said gates so that the charge packets of said first delay lines arrive under said second floating gate delayed in time with respect to charge packets arriving under said second floating gate of said first delay line by a time equal to an integer multiple of said horizontal scanning interval; and means responsive to said clock signals for periodically clamping said second floating gate to said reference potential to sense a voltage when not clamped to said reference potential which is representative of the additive combination of said charge packets under said second floating gate of said first and third delay lines and thereby representative of said luminance compononents, said additional number of gates establishing a predetermined time dalay between said sensed luminance and chrominance components.

7. A comb filter for processing a composite video signal containing image representative luminance and chrominance components in a horizontal scanning interval, said luminance and chrominance components disposed within a frequency spectrum in an interleaved relation, said chrominance components alternating in phase between consecutive horizontal intervals, comprising:

a substrate;

a first delay line including a first channel structure formed in said substrate having one input section and first and second output sections;

a second delay line including a second channel structure formed in said substrate having one input section and first and second output sections;

a first floating gate overlying said first output section of both of said first and second channel structures;

said first delay line also including a first number of gates overlying said first channel structure between a first gate thereof and said first floating gate;

said second delay line also including a second number, different from said first number, of gates overlying said second channel structure between gate thereof and said first floating gate;

first and second input means each responsive to said composite video signal for coupling charge packets representing samples of said composite video signal to said first and second channel structures, respectively;

means for applying clock signals to said gates of said first and second delay lines for transferring said charge packets under said gates so that the charge packets of one of said first and second delay lines arrive under said first floating gate delayed in time with respect to the charge packets arriving under the gate preceding said first floating gate of the other of said first and second delay lines by an amount equal to an integer multiple of said horizontal scanning interval; and means responsive to said clock signals for periodically clamping said first floating gate to a reference potential to sense a voltage at said floating gate when not clamped to said reference potential which is representative of a substractive combination of said charge packets under said first floating gate and said charge packets under said gate preceding said first floating gate and thereby representative of said chrominance components of said composite video signal;

a second floating gate overlying said second output sections of both of said first and second channel;

said first delay line also including a third number, greater than said first number, of gates overlying said first channel structure between a first gate thereof and said second floating gate;

said second delay line also including a fourth number greater than said second number, of gates overlying said second channel structure between a first gate thereof and said second floating gate;

means for applying clock signals to said third and fourth number of gates of said first and second delay lines for transferring said charge packets under said gates so that the charge packets of said first delay line arrive under said second floating gate delayed in time with respect to the charge packets arriving under said second floating gate of said second delay line by a time equal to an integer multiple of said horizontal scanning interval; and means responsive to said clock signals for periodically clamping said second floating gate to a reference potential to sense a voltage at said second floating gate when not clamped to said reference potential which is representative of a additive combination of said charge packets arriving under said second floating gate and thereby representative of said luminance components of said composite video signal, said third and fourth number of gates establishing a predetermined time delay between said sensed luminance and chrominance components.

8. The comb filter as set forth in claims 1, 6 or 7 wherein said integer multiple of said scanning interval is equal to 1.

9. A comb filter for processing a composite video signal containing image representative luminance and chrominance components in a horizontal scanning interval, said luminance and chrominance components disposed within a frequency spectrum in an interleaved relation, said chrominance components alternating in phase between consecutive horizontal scanning intervals, comprising:

means for providing first and second pulse trains of charge packets representative of said composite video signal;

a first charge transfer channel structure formed in a substrate, having a number of clocked gates overlying said first channel structure for forming a first delay line, having an input section coupled to said providing means and an output section, for transferring charge packets of said first pulse train therethrough, said input section being split into first and second delay line portions for dividing said charge packets into two substantially equal magnitude packets and, after an unequal number of gates merging together for additively recombing said equal magnitude charge packets with a relative delay therebetween of twice the horizontal line interval and providing at said output section of said first delay line said recombined packets with a relative delay from said charge packets at said input section which is incrementally greater than twice the horizontal scanning interval;

a second charge transfer channel formed in said substrate having a different number of gates overlying said second channel for forming a second delay line having an input section coupled to said providing means and an output section, for transferring charge packets of said second pulse train therethrough and providing said charge packets at the output section of said second delay line relatively delayed from the charge packets at said input section of said second delay line by one horizontal scanning interval plus said incremental amount;

a third charge transfer channel formed in said substrate having a number of gates overlying said third channel for forming a third delay line having an input section for receiving said recombined charge packets provided at the output section of said first delay line, and having an output section;

a fourth charge transfer channel formed in said substrate, having a number of gates overlying said fourth channel for providing a fourth delay line having an input section for receiving charge packets of said second pulse train provided at the output section of said second delay line, and having an output section;

a first floating gate overlying the output sections of both said third and fourth delay lines;

means for applying clock signals to said gates of said third and fourth delay lines for transferring said respective charge packets under said gates so that said third and fourth delay lines maintain the relative time delay between said recombined charge packets and the charge packets of said first pulse train from said input section of one of said third and fourth delay lines to said floating gate and from said input section of the other one of said third and fourth delay lines to a gate preceding said floating gate;

means responsive to said clock signals for periodically clamping said floating gate to a reference potential to sense a voltage at said floating gate when not clamped to said reference potential which is representative of a subtractive combination of said charge packets under said floating gate and said charge packets under said gate preceding said floating gate and thereby representative of said chrominance components of said composite video signal.

10. A comb filter as said forth in claim 9, further including;

a second floating gate overlying the output sections of said third and fourt delay lines and spaced a predetermined number of gates from said first floating gate;

means for applying clock signals to said predetermined number of gates of said third and fourth delay lines for transferring said charge packets under said gates so that charge packets of said third and fourth delay lines maintain their relative time delay and arrive at said second floating gate at substantially the same time;

means responsive to said clock signals for periodically clamping said second floating gate to said referenced potential to sense a voltage at said second floating gate when not clamped to said reference potential which is representative of an additive combination of said charge packets of said third and fourth delay lines arriving under said floating gate and thereby representative of said luminance components of said composite video signal; and wherein:

said predetermined number of gates establishes a predetermined time delay between said sensed luminance and chrominance components.

11. A comb filter as set forth in claim 9, further including:

a fifth charge transfer channel formed in said substrate having a number of gates overlying said fifth channel for forming a fifth delay line having an input section for receiving said recombined charge packets provided at the output section of said first delay line, and having an output section;

a sixth charge transfer channel formed in said substrate, having a number of gates overlying said sixth channel for providing a sixth delay line having an input section for receiving charge packets of said second pulse train provided at the output section of said second delay line, and having an output section;

a second floating gate overlying the output sections of both said fifth and sixth delay lines;

means for applying clock signals to said gates of said fifth and sixth delay lines for transferring said respective charge packets under said gates so that said fifth and sixth delay lines maintain the relative time delay between said recombined charge packets and the charge packets of said first pulse train and arrive at said second floating gate at substantially the same time;

means responsive to said clock signals for periodically clamping said second floating gate to a reference potential to sense a voltage at said second floating gate when not clamped to said reference potential which is representative of an additive combination of said charge packets of said fifth and sixth delay lines arriving under said second floating gate and thereby representative of said luminance components of said composite video signal.

12. The comb filter as set forth in claim 1 wherein said integer multiple of said scanning interval is equal to two.

* * * * *